(12) United States Patent
Yamasaki et al.

(10) Patent No.: US 10,518,364 B2
(45) Date of Patent: Dec. 31, 2019

(54) FLUX AND RESIN COMPOSITION FOR FLUX

(71) Applicant: SENJU METAL INDUSTRY CO., LTD., Tokyo (JP)

(72) Inventors: Hiroyuki Yamasaki, Tokyo (JP); Takashi Hagiwara, Tokyo (JP); Hiroyoshi Kawasaki, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 16/306,858

(22) PCT Filed: Apr. 4, 2018

(86) PCT No.: PCT/JP2018/014383
§ 371 (c)(1),
(2) Date: Dec. 3, 2018

(87) PCT Pub. No.: WO2019/123674
PCT Pub. Date: Jun. 27, 2019

(65) Prior Publication Data
US 2019/0358754 A1    Nov. 28, 2019

(30) Foreign Application Priority Data

Dec. 21, 2017  (JP) ................................ 2017-244926

(51) Int. Cl.
*C08K 5/17* (2006.01)
*B23K 35/362* (2006.01)
*C08K 5/5313* (2006.01)
*C08K 5/5317* (2006.01)
*C08L 93/04* (2006.01)

(52) U.S. Cl.
CPC .............. *B23K 35/362* (2013.01); *C08K 5/17* (2013.01); *C08K 5/5313* (2013.01); *C08K 5/5317* (2013.01); *C08L 93/04* (2013.01)

(58) Field of Classification Search
CPC ...... B32K 35/362; C08K 5/17; C08K 5/5313; C08K 5/5317
See application file for complete search history.

(56) References Cited

U.S. PATENT DOCUMENTS

| | | |
|---|---|---|
| 2005/0217757 A1 | 10/2005 | Miyano |
| 2009/0308496 A1 | 12/2009 | Kawamata et al. |
| 2013/0192722 A1* | 8/2013 | Kang ................... B23K 35/362 148/23 |

FOREIGN PATENT DOCUMENTS

| | | |
|---|---|---|
| JP | H05-245622 A | 9/1993 |
| JP | H08-57685 A | 3/1996 |
| JP | 2002-361484 A | 12/2002 |
| JP | 2005-059027 A | 3/2005 |
| JP | 2005-169495 A | 6/2005 |
| JP | 2006-015348 A | 1/2006 |
| WO | WO-2008-072654 A1 | 6/2008 |

OTHER PUBLICATIONS

International Search Report and Written Opinion of the International Searching Authority issued in PCT/JP2018/014383 (in Japanese), dated Jun. 19, 2018; ISA/JP.
Decision to Grant a Patent issued in JP-2017-244926 (granted as JP-6322881-B1), dated Mar. 8, 2018 (with English Translation).
International Search Report and Written Opinion of the International Searching Authority issued in PCT/JP2018/014383, dated Jun. 19, 2018 (English translation).

* cited by examiner

*Primary Examiner* — Peter D. Mulcahy
(74) *Attorney, Agent, or Firm* — Harness, Dickey & Pierce, PLC

(57) ABSTRACT

An object of the present invention is to provide a flux in which the occurrence of a bridge and a ball is suppressed at the time of soldering, and a resin composition for the flux. The flux comprising: at least one selected from 0.3 to 2.0 mass % of an organochlorine compound, and more than 0.04 mass % and 1.00 mass % or less of an amine hydrochloride; and
0.2 to 1.5 mass % of an organophosphorus compound that is at least one selected from a phosphonic acid ester and a phenyl-substituted phosphinic acid, each based on the whole flux.

9 Claims, No Drawings

FLUX AND RESIN COMPOSITION FOR FLUX

CROSS-REFERENCE TO RELATED APPLICATIONS

This application is the U.S. National Phase Application under 35 U.S.C. 371 of International Application No. PCT/JP2018/014383, filed on Apr. 4, 2018, which claims the benefit of priority from Japanese Patent Application 2017-244926 filed on Dec. 21, 2017. The entire disclosures of these applications are incorporated herein by reference in their entirety.

TECHNICAL FIELD

The present invention relates to a flux and a resin composition for the flux.

BACKGROUND ART

Fixation and electrical connection of an electronic component in electronic equipment, such as mounting of the electronic component on a printed board, are generally performed by soldering, which is most advantageous in terms of cost and reliability.

A method generally adopted for such soldering is a flow soldering method of bringing the printed board and the electronic component into contact with a molten solder to perform the soldering, and a reflow soldering method of remelting a solder having a form of a solder paste, a solder preform or a solder ball in a reflow furnace to perform the soldering.

In this soldering, a flux, which is an auxiliary agent for making solder easily adhere to the printed board and the electronic component, is used. The flux plays many useful actions such as: (1) a metal surface cleaning action (action of chemically removing oxide films on metal surfaces of printed board and electronic component to clean surfaces so that the surfaces can be soldered); (2) an reoxidation-preventing action (action of covering cleaned metal surface during soldering, blocking contact with oxygen, and preventing metal surface from being reoxidized by heating); and (3) an interfacial tension lowering action (action of reducing surface tension of molten solder and enhancing wettability of metal surface with solder).

In the soldering of the printed board by the flow soldering method, a flux (post flux) is applied to a portion to be soldered before or after the electronic component is mounted. After that, the printed board after the post flux has been applied is made to pass over the solder which is jetted, in the flow soldering apparatus, and flow soldering is performed.

As a flux used for soldering by a conventional flow soldering method, a no-clean resin-based flux for a lead-free solder which contains at least one compound selected from a base resin, an activator, an acid phosphate ester and a derivative thereof, in an amount of 0.2 to 4 mass % is proposed in PTL 1. In an Example of PTL 1, a flux which uses an amine borohydrofluoride as an activator, and a phosphonic acid ester (phosphonate) or a phosphoric acid ester (phosphate) as an acid phosphate ester is specifically shown.

CITATION LIST

Patent Literature

PTL 1: International Publication No. WO 2008/072654

SUMMARY OF INVENTION

Technical Problem

However, in the flux described in PTL 1, it has not been considered to suppress a phenomenon (bridge) in which adjacent electronic components are electrically connected to each other by a solder when the flux is used in the flow soldering method, or a phenomenon in which a ball (solder ball) occurs between the adjacent electronic components; and it has been found that when a flux containing an amine hydrohalide salt other than amine hydrochloride and a phosphonic acid ester, or a flux containing amine hydrochloride and a phosphoric acid ester is used, a bridge or a ball results in occurring, as will be described later in the Comparative Example of the present application.

As described above, a flux in which the occurrence of a bridge and a ball is suppressed at the time of soldering is desired.

An object of the present invention is to provide a flux in which the occurrence of a bridge and a ball is suppressed at the time of soldering, and a resin composition for the flux.

Solution to Problem

As a result of having made an extensive investigation so as to solve the above described problems, the present inventors have found that the above described problems can be solved using a flux which contains both of a specific activator containing a chlorine atom and a specific organophosphorus compound each at a specific mass %, and have accomplished the present invention. Specific aspects of the present invention are as follows.

In the present specification, when a numeric range is expressed with the use of "to", the range includes numeric values at both ends.

[1] A flux comprising:
at least one selected from 0.3 to 2.0 mass % of an organochlorine compound, and more than 0.04 mass % and 1.00 mass % or less of an amine hydrochloride; and
0.2 to 1.5 mass % of an organophosphorus compound that is at least one selected from a phosphonic acid ester and a phenyl-substituted phosphinic acid, each based on the whole flux.

[2] The flux according to [1] further comprising: a rosin-based resin, and an organic acid excluding the organochlorine compound.

[3] The flux according to [1] or [2], wherein the organochlorine compound is at least one selected from chlorendic acid, chlorendic anhydride and methyl pentachlorooctadecanoate.

[4] The flux according to any of [1] to [3], wherein the amine hydrochloride is ethylamine hydrochloride.

[5] The flux according to any of [1] to [4], wherein the phosphonic acid ester is at least one selected from 2-ethylhexyl (2-ethylhexyl) phosphonate, n-octyl (n-octyl) phosphonate, n-decyl (n-decyl) phosphonate and n-butyl (n-butyl) phosphonate.

[6] The flux according to any of [1] to [5], wherein the phenyl-substituted phosphinic acid is at least one selected from phenylphosphinic acid and diphenylphosphinic acid.

[7] The flux according to any of [1] to [6] for use in a flow soldering method.

[8] A resin composition for a flux, comprising:
at least one selected from 2.0 to 14.0 mass % of an organochlorine compound and 0.27 to 7.00 mass % of an amine hydrochloride; and
1.0 to 10.0 mass % of an organophosphorus compound that is at least one selected from a phosphonic acid ester and a phenyl-substituted phosphinic acid, each based on the whole composition for a flux.

[9] The resin composition according to [8] further comprising a rosin-based resin, and an organic acid excluding the organochlorine compound.

Advantageous Effects of Invention

The flux and the resin composition for the flux of the present invention can suppress the occurrence of a bridge and a ball at the time of soldering.

DESCRIPTION OF EMBODIMENTS

The flux and the resin composition for the flux of the present invention will be described below.

The flux of the present invention comprises: at least one selected from 0.3 to 2.0 mass % of an organochlorine compound and more than 0.04 mass % and 1.00 mass % or less of an amine hydrochloride; and 0.2 to 1.5 mass % of an organophosphorus compound that is at least one selected from a phosphonic acid ester and a phenyl-substituted phosphinic acid.

As the organochlorine compound, at least one selected from chlorendic acid, chlorendic anhydride, methyl pentachlorooctadecanoate and the like can be used.

When the flux contains the organochlorine compound, the content of the organochlorine compound based on the total mass of the flux is 0.3 to 2.0 mass %, and is preferably 0.5 to 1.5 mass %.

As the amine hydrochloride, at least one selected from stearylamine hydrochloride, diethylaniline hydrochloride, diethanolamine hydrochloride, dimethyl amine hydrochloride, 2-ethylhexylamine hydrochloride, isopropylamine hydrochloride, cyclohexylamine hydrochloride, 1,3-diphenylguanidine hydrochloride, dimethylbenzylamine hydrochloride, dimethylcyclohexylamine hydrochloride, 2-diethylaminoethanol hydrochloride, diallyl amine hydrochloride, monoethylamine hydrochloride, diethylamine hydrochloride, triethylamine hydrochloride, hydrazine monohydrochloride, hydrazine dihydrochloride, pyridine hydrochloride, butylamine hydrochloride, hexylamine hydrochloride, n-octylamine hydrochloride, dodecylamine hydrochloride, L-glutamic acid hydrochloride, N-methylmorpholine hydrochloride, betaine hydrochloride and the like can be used. Among these, ethylamine hydrochlorides are preferable, such as monoethylamine hydrochloride, diethylamine hydrochloride and triethylamine hydrochloride.

When the flux contains the amine hydrochloride, the content of the amine hydrochloride based on the total mass of the flux is more than 0.04 mass % and 1.00 mass % or less, and is preferably 0.05 to 0.50 mass %.

The flux of the present invention may contain only either one of the organochlorine compound and the amine hydrochloride, or may contain both of the organochlorine compound and the amine hydrochloride.

As the phosphonic acid ester which is the organophosphorus compound, at least one selected from 2-ethylhexyl (2-ethylhexyl) phosphonate, n-octyl (n-octyl) phosphonate, n-decyl (n-decyl) phosphonate, n-butyl (n-butyl) phosphonate and the like can be used.

When the flux contains the phosphonic acid ester as the organophosphorus compound, the content of the phosphonic acid ester based on the total mass of the flux is 0.2 to 1.5 mass %, and is preferably 0.3 to 1.0 mass %.

As the phenyl-substituted phosphinic acid which is the organophosphorus compound, at least one selected from phenylphosphinic acid, diphenylphosphinic acid and the like can be used.

When the flux contains the phenyl-substituted phosphinic acid as the organophosphorus compound, the content of the phenyl-substituted phosphinic acid based on the total mass of the flux is 0.2 to 1.5 mass %, and is preferably 0.3 to 1.0 mass %.

The flux of the present invention may contain only either one of the phosphonic acid ester and the phenyl-substituted phosphinic acid as the organophosphorus compound, or may contain both of the phosphonic acid ester and the phenyl-substituted phosphinic acid.

As long as the content of the organochlorine compound and/or the amine hydrochloride, and the content of the phosphonic acid ester and/or the phenyl-substituted phosphinic acid that is the organophosphorus compound are within the above described ranges, the effect of suppressing the occurrence of a bridge and a ball is exhibited.

The flux of the present invention can further contain a rosin-based resin and/or other resins, and an organic acid excluding the organochlorine compound.

Examples of the rosin-based resins include raw material rosin such as gum rosin, wood rosin, tall oil rosin and a derivative obtained from the raw material rosin. Examples of the derivatives include: purified rosin, hydrogenated rosin, disproportionated rosin and polymerized rosin; and modified products of α,β-unsaturated carboxylic acid (acrylated rosin, maleinized rosin, fumarylated rosin and the like); and a purified product, a hydride and a disproportionated product of the polymerized rosin; and a purified product, a hydride and a disproportionated product of the modified product of the α,β-unsaturated carboxylic acid. Two or more of the above derivatives can be used. As the rosin-based resin, acrylic acid modified hydrogenated rosin, acrylic acid modified rosin, disproportionated rosin, hydrogenated rosin, a rosin ester and the like are preferable.

In addition, as other resins, at least one selected from a terpene resin, a modified terpene resin, a terpene phenol resin, a modified terpene phenol resin, a styrene resin, a modified styrene resin, a xylene resin and a modified xylene resin can be used. As the modified terpene resin, an aromatic modified terpene resin, a hydrogenated terpene resin, a hydrogenated aromatic modified terpene resin and the like can be used. As the modified terpene phenol resin, a hydrogenated terpene phenol resin and the like can be used. As the modified styrene resin, a styrene acrylic resin, a styrene maleic acid resin and the like can be used. As the modified xylene resin, a phenol-modified xylene resin, an alkylphenol-modified xylene resin, a phenol-modified resol type xylene resin, a polyol-modified xylene resin, a polyoxyethylene-added xylene resin and the like can be used.

The content of the rosin-based resin and/or other resins based on the total mass of the flux is preferably 2.0 to 18.0 mass % and more preferably 6.0 to 15.0 mass %. As long as the content of the rosin-based resin and/or the other resins is within the above described range, it is possible to have moisture resistance and thereby improve insulating properties. Other resins can be used in place of a part or all of the rosin-based resin.

As the organic acid excluding the organochlorine compound, adipic acid, azelaic acid, eicosanedioic acid, citric acid, glycolic acid, glutaric acid, succinic acid, salicylic acid, diglycolic acid, dipicolinic acid, dibutylaniline diglycolic acid, suberic acid, sebacic acid, thioglycolic acid, terephthalic acid, dodecanedioic acid, parahydroxyphenylacetic acid, palmitic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, malic acid, p-anisic acid, stearic acid, 12-hydroxystearic acid, oleic acid, linoleic acid, linolenic acid, dimer acid, hydrogenated dimer acid, trimer acid, hydrogenated trimer acid and the like can be used. The content of the organic acid based on the total mass of the flux is preferably 0.1 to 7.0 mass % and more preferably 0.1 to 3.0 mass %. As long as the content of the organic acid is within the above described range, it is possible to improve the wettability of the solder.

The flux of the present invention can further contain an activator other than the above described organochlorine compound, amine hydrochloride and organic acid, in order to improve solderability. As such an activator, an amine compound, an amine hydrohalide salt, an organohalogen compound and the like can be used.

As the amine compounds, aliphatic amines, aromatic amines, amino alcohols, imidazoles, benzotriazoles, amino acids, guanidines, hydrazides and the like can be used. Examples of the aliphatic amines include dimethylamine, ethylamine, 1-aminopropane, isopropylamine, trimethylamine, allylamine, n-butylamine, diethylamine, sec-butylamine, tert-butylamine, N,N-dimethylethylamine, isobutylamine and cyclohexylamine. Examples of the aromatic amines include aniline, N-methylaniline, diphenylamine, N-isopropylaniline and p-isopropylaniline. Examples of the amino alcohols include 2-aminoethanol, 2-(ethylamino)ethanol, diethanolamine, diisopropanolamine, triethanolamine, N-butyl diethanol amine, triisopropanolamine, N,N-bis(2-hydroxyethyl)-N-cyclohexylamine, N,N,N',N'-tetrakis(2-hydroxypropyl)ethylenediamine and N,N,N',N'',N''-pentakis(2-hydroxypropyl)diethylenetriamine. Examples of the imidazoles include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1)]-ethyl-s-triazine, 2,4-diamino-6-[2'-undecylimidazolyl-(1)]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 2-methylimidazoline, 2-phenylimidazoline, 2,4-diamino-6-vinyl-s-triazine, a 2,4-diamino-6-vinyl-s-triazine isocyanuric acid adduct, 2,4-diamino-6-methacryloyloxyethyl-s-triazine, an epoxy-imidazole adduct, 2-methylbenzimidazole, 2-octyl benzimidazole, 2-pentylbenzimidazole, 2-(1-ethylpentyl) benzimidazole, 2-nonylbenzimidazole, 2-(4-thiazolyl) benzimidazole and benzimidazole. Examples of the benzotriazole include 2-(2'-hydroxy-5'-methylphenyl)benzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenyl], 6-(2-benzotriazolyl)-4-tert-octyl-6'-tert-butyl-4'-methyl-2, 2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl] methylbenzotriazole, 2,2'-[[(methyl-1H-benzotriazol-1-yl) methyl]imino]bisethanol, an aqueous solution of 1,2,3-benzotriazole sodium salt, 1-(1',2'-dicarboxyethyl) benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol and 5-methylbenzotriazole. Examples of the amino acids include alanine, arginine, asparagine, aspartic acid, glutamine, glutamic acid, glycine, histidine, isoleucine, leucine, methionine, phenylalanine, proline, serine, threonine, tryptophan, tyrosine, valine, β-alanine, γ-aminobutyric acid, δ-amino valeric acid, ε-aminohexanoic acid, ε-caprolactam and 7-aminoheptanoic acid. Examples of the guanidines include dicyandiamide, 1,3-diphenylguanidine and 1,3-di-o-tolylguanidine. Examples of the hydrazides include carbodihydrazide, malonic acid dihydrazide, succinic acid dihydrazide, adipic acid dihydrazide, 1,3-bis(hydrazinocarbonoethyl)-5-isopropylhydantoin, sebacic acid dihydrazide, dodecanedioic acid dihydrazide, 7,11-octadecadiene-1,18-dicarbohydrazide and isophthalic acid dihydrazide.

The content of the amine compound based on the total mass of the flux is preferably 0 to 2.0 mass %, more preferably 0.1 to 2.0 mass %, and most preferably 0.1 to 0.8 mass %. As long as the content of the amine compound is within the above described range, it is possible to improve the wettability of the solder.

As the amine hydrohalide salt, a hydrohalide salt (salt of HF, HBr or HI) other than the hydrochloride of the amine compound shown above can be used. Examples of the amine hydrohalide salts include 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, rosin amine hydrobromide, 2-pipecoline hydrobromide, hydrazine hydrate hydrobromide, trinonylamine hydrobromide, diethylaniline hydrobromide, 2-diethylaminoethanol hydrobromide, ammonium chloride, diallylamine hydrobromide, monoethylamine hydrobromide, triethylamine hydrobromide, hydrazine monohydrobromide, hydrazine dihydrobromide, aniline hydrobromide, dimethylcyclohexylamine hydrobromide, ethylenediamine dihydrobromide, rosin amine hydrobromide, 2-phenylimidazole hydrobromide, 4-benzylpyridine hydrobromide, 2-pipecoline hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosin amine hydrofluoride, cyclohexylamine tetrafluoroborate and dicyclohexylamine tetrafluoroborate.

The content of the amine hydrohalide salt based on the total mass of the flux is preferably 0 to 2.0 mass % and more preferably 0.02 to 0.5 mass %. As long as the content of the amine hydrohalide salt is within the above described range, it is possible to improve the wettability of the solder.

As the organohalogen compounds, trans-2,3-dibromo-2-butene-1,4-diol, 2,3-dibromo-1,4-butanediol, 2,3-dibromo-1-propanol, 2,3-dichloro-1-propanol, 1,1,2,2-tetrabromoethane, 2,2,2-tribromoethanol, pentabromoethane, carbon tetrabromide, 2,2-bis(bromomethyl)-1,3-propanediol, meso-2,3-dibromosuccinic acid, n-hexadecyltrimethylammonium bromide, triallyl isocyanurate hexabromide, 2,2-bis[3,5-dibromo-4-(2,3-dibromopropoxy)phenyl]propane, bis[3,5-dibromo-4-(2,3-dibromopropoxy)phenyl]sulfone, ethylene bispentabromobenzene, a bromo bisphenol A type epoxy resin, and the like can be used.

The content of the organohalogen compound based on the total mass of the flux is preferably 0 to 3.0 mass % and more preferably 0.1 to 1.5 mass %. As long as the content of the organohalogen compound is within the above described range, it is possible to improve the wettability of the solder.

The flux of the present invention can further contain a solvent, a coloring agent, a surface active agent and the like.

As the solvent, various alcoholic solvents and like, for example, isopropyl alcohol, industrial ethanol and a mixed alcohol can be used. The content of the solvent based on the total mass of the flux is preferably 80.0 to 95.0 mass %. As long as the content of the solvent is within the above described range, the flux exhibits good application properties.

A resin composition for the flux of the present invention comprises: at least one selected from 2.0 to 14.0 mass % of an organochlorine compound and 0.27 to 7.00 mass % of an amine hydrochloride; and 1.0 to 10.0 mass % of an organophosphorus compound that is at least one selected from a phosphonic acid ester and a phenyl-substituted phosphinic acid.

As the organochlorine compounds, the foregoing can be used.

When the resin composition for the flux contains an organochlorine compound, the content of the organochlorine compound based on the total mass of the resin composition for the flux is 2.0 to 14.0 mass %, and is preferably 3.0 to 10.0 mass %.

As the amine hydrochlorides, the foregoing can be used.

When the resin composition for the flux contains an amine hydrochloride, the content of the amine hydrochloride based on the total mass of the resin composition for the flux is 0.27 to 7.00 mass %, and is preferably 0.30 to 3.50 mass %.

The resin composition for the flux of the present invention may contain only either one of the organochlorine compound and the amine hydrochloride, or may contain both of the organochlorine compound and the amine hydrochloride.

As the phosphonic acid ester which is an organophosphorus compound, the foregoing can be used.

When the resin composition for the flux contains the phosphonic acid ester as the organophosphorus compound, the content of the phosphonic acid ester based on the total mass of the resin composition for the flux is 1.0 to 10.0 mass %, and is preferably 2.0 to 7.0 mass %.

As the phenyl-substituted phosphinic acid which is an organophosphorus compound, the foregoing can be used.

When the resin composition for the flux contains a phenyl-substituted phosphinic acid as the organophosphorus compound, the content of the phenyl-substituted phosphinic acid based on the total mass of the resin composition for the flux is 1.0 to 10.0 mass %, and is preferably 2.0 to 7.0 mass %.

The resin composition for the flux of the present invention may contain only either one of the phosphonic acid ester and the phenyl-substituted phosphinic acid as the organophosphorus compound, or may contain both of the phosphonic acid ester and the phenyl-substituted phosphinic acid.

As long as the content of the organochlorine compound and/or the amine hydrochloride, and the content of the phosphonic acid ester and/or the phenyl-substituted phosphinic acid that is the organophosphorus compound are within the above described ranges, the effect of suppressing the occurrence of a bridge and a ball is exhibited.

In the present invention, it is possible to prepare the flux by heating and mixing at least one selected from 0.3 to 2.0 mass % of an organochlorine compound and more than 0.04 mass % and 1.00 mass % or less of an amine hydrochloride, and 0.2 to 1.5 mass % of an organophosphorus compound that is at least one selected from a phosphonic acid ester and a phenyl-substituted phosphinic acid, by a method known in the art.

In addition, in the present invention, it is also possible to prepare the flux by preparing the resin composition for the flux by heating and mixing at least one selected from 2.0 to 14.0 mass % of the organochlorine compound and 0.27 to 7.00 mass % of the amine hydrochloride, and 1.0 to 10.0 mass % of the organophosphorus compound that is at least one selected from the phosphonic acid ester and the phenyl-substituted phosphinic acid, by a method known in the art; and by diluting the resin composition for the flux with a solvent. A mass ratio (resin composition for flux:solvent) between the resin composition for the flux and the solvent, at the time when the resin composition for the flux is diluted with the solvent, is preferably 1:99 to 30:70, more preferably 5:95 to 20:80, and most preferably 10:90 to 16:84.

The flux of the present invention can be used for a flow soldering method.

As a composition of a solder alloy used in the flow soldering method, a known composition of a solder alloy can be used. Specifically, examples of the solder alloys include an Sn—Ag alloy, an Sn—Cu alloy, an Sn—Ag—Cu alloy, an Sn—In alloy, an Sn—Pb alloy, an Sn—Bi alloy, an Sn—Ag—Cu—Bi alloy, and an alloy in which Ag, Cu, In, Ni, Co, Sb, Ge, P, Fe, Zn, Ga and/or the like is further added to the above described alloy composition.

The present invention will be specifically described below with reference to Examples, but the present invention is not limited to the contents described in the Examples.

EXAMPLES (Evaluation)

Each flux of Examples 1 to 47 and Comparative Examples 1 to 13 was subjected to (1) evaluation of the occurrence of a bridge and (2) evaluation of the occurrence of a ball, as follows.

(1) Evaluation of Occurrence of Bridge

On an evaluation substrate, silk printing portions (2 mm square, and line diameter of 0.5 mm) are aligned in an amount of 2×12 pieces (2 rows where one row has 12 pieces); a land (diameter of 1.5 mm) is arranged in the center of each silk printing portion; and a hole with a diameter of 1 mm is formed in each land. On the evaluation substrate, there are 20 regions each having 2×12 pieces of the silk printing portions (patterns); 480 lands in total exist; and a lead of a connector is inserted into the hole of the Cu—OSP treated land. The leads of the connectors are aligned at a pitch of 2 mm, and are in a state in which a phenomenon (bridge) in which the adjacent leads are electrically connected by soldering easily occurs.

The flux of each of Examples 1 to 47 and Comparative Examples 1 to 13 was applied to the evaluation substrate at a flow rate of 0.3 mL/sec using Spray Fluxer SSF-300 (manufactured by SENJU METAL INDUSTRY CO., LTD.); and flow soldering was carried out using a flow soldering apparatus: ECOPASCAL SPF-300 (manufactured by SENJU METAL INDUSTRY CO., LTD.), which was provided with a solder melted at 255° C.: SAC 305 (Sn-3Ag-0.5 Cu (each numerical value is mass %)).

On the evaluation substrate after soldering, the number of the leads which caused the bridge out of 480 leads of the connectors in total was counted.

When the number of leads that caused the bridge was less than 50, the flux was defined as good (◯), and when the number was 50 or more, the flux was defined as poor (X), (2) Evaluation of Occurrence of Ball The same evaluation substrates as those in the above described (1) were used and subjected to the flow soldering in the same manner as the above described (1).

On the evaluation substrate after soldering, the number of the balls (solder balls)

When the number of balls was less than 10, the flux was defined as good (◯), and when the number was 0.10 or more, the flux was defined as poor (X).
which occurred between the adjacent leads in 480 leads of connectors in total was counted.

Examples 1 to 4 and Comparative Examples 1 to 6

The fluxes of Examples 1 to 4 and Comparative Examples 1 to 6 were prepared with the compositions shown in the following Table 1.

The numeric values of each component in the following Tables 1 to 8 represent mass % of each of the components based on the total mass of the flux, and "balance" in a "solvent" column indicates that by adding the solvent to the total of the components other than the solvent, the whole flux becomes 100 mass %.

Then, the fluxes of Examples 1 to 4 and Comparative Examples 1 to 6 were subjected to (1) the evaluation of the occurrence of a bridge and (2) the evaluation of the occurrence of a ball, as described above. The evaluation results are shown in the following Table 1.

As in the results in the above described Table 1, in the fluxes of Examples 1 to 4 which contained 0.3 to 2.0 mass % of an organochlorine compound or more than 0.04 mass % and 1.00 mass % or less of an amine hydrochloride and 0.2 to 1.5 mass % of a phosphonic acid ester, there was little occurrence of both of the bridge and the ball, and good results were obtained. In any of the fluxes of Examples 1 to 3 which contained 0.3 to 2.0 mass % of the organochlorine compound and the flux of Example 4 which contained more than 0.04 mass % and 1.00 mass % or less of the amine hydrochloride, there was little occurrence of the bridge, but a tendency that there was less occurrence of the bridge in the fluxes of Examples 1 to 3 which contained the organochlorine compound than the flux of Example 4 which contained the amine hydrochloride was seen.

On the other hand, in the fluxes of Comparative Examples 1 to 3 which contained the phosphoric acid ester instead of the phosphonic acid ester, there was little occurrence of the bridge, but there was much occurrence of the ball.

In addition, in the fluxes of Comparative Examples 4 and 5 which contained an organobromine compound instead of the organochlorine compound, and the flux of Comparative Example 6 which contained an amine hydrobromide instead of the amine hydrochloride, there was little occurrence of the ball, but there was much occurrence of the bridge.

Examples 5 to 11 and Comparative Examples 7 to 11

The fluxes of Examples 5 to 11 and Comparative Examples 7 to 11 were prepared in the same manner as in Examples 1 to 4 and Comparative Examples 1 to 6, except that compositions shown in the following Tables 2 and 3 were used in place of the compositions shown in the above described Table 1.

Then, each flux of Examples 5 to 11 and Comparative Examples 7 to 11 was subjected to (1) the evaluation of the occurrence of a bridge and (2) the evaluation of the occurrence of a ball, as described above. The evaluation results are shown in the following Tables 2 and 3.

TABLE 1

|  |  | Examples | | | | Comparative Examples | | | | | |
|---|---|---|---|---|---|---|---|---|---|---|---|
|  |  | 1 | 2 | 3 | 4 | 1 | 2 | 3 | 4 | 5 | 6 |
| Rosin-based resins | Acrylic acid modified hydrogenated rosin | 340 | 3.40 | 3.40 | 3.40 | 3.40 | 3.40 | 3.40 | 3.40 | 3.40 | 3.40 |
|  | Disproportionated rosin | 7.00 | 7.00 | 7.00 | 7.00 | 7.00 | 7.00 | 7.00 | 7.00 | 7.00 | 7.00 |
|  | Rosin ester | 1.60 | 1.60 | 1.60 | 1.60 | 1.60 | 1.60 | 1.60 | 1.60 | 1.60 | 1.60 |
| Solvent | Isopropyl alcohol | Balance | Balance | Balance | Balance | Balance | Balance | Balance | Balance | Balance | Balance |
| Organic acids | Succinic acid | 0.30 | 0.30 | 0.30 | 0.30 | 0.30 | 0.30 | 0.30 | 0.30 | 0.30 | 0.30 |
|  | Palmitic acid | 0.30 | 0.30 | 0.30 | 0.30 | 0.30 | 0.30 | 0.30 | 0.30 | 0.30 | 0.30 |
| Organochlorine compounds | Chlorendic acid |  | 0.90 |  |  | 0.90 |  |  |  |  |  |
|  | Chlorendic anhydride |  |  | 0.90 |  |  |  |  |  |  |  |
|  | Methyl pentachlorooctadecanoate[*1] | 0.90 |  |  |  |  | 0.90 |  |  |  |  |
| Organobromine compounds | Dibromosuccinic acid |  |  |  |  |  |  |  |  | 0.90 |  |
|  | trans-2,3-Dibromo-2-butene-1,4-diol |  |  |  |  |  |  |  | 0.90 |  |  |
| Amine hydrochloride | Monoethylamine hydrochloride |  |  |  | 0.17 |  |  | 0.17 |  |  |  |
| Amine hydrobromide | 1,3-Diphenylguanidine hydrobromide |  |  |  |  |  |  |  |  |  | 0.17 |
| Phosphonic acid ester | 2-Ethylhexyl (2-ethylhexyl) phosphonate | 0.50 | 0.50 | 0.50 | 0.50 |  |  |  | 0.50 | 0.50 | 0.50 |
| Phosphoric acid ester | (Mono-/di-)isodecyl acid phosphate |  |  |  |  |  |  |  |  |  |  |
| Evaluation | Occurrence of bridge | ◯ | ◯ | ◯ | ◯ | ◯ | ◯ | ◯ | X | X | X |
|  | Occurrence of ball | ◯ | ◯ | ◯ | ◯ | X | X | X | ◯ | ◯ | ◯ |
|  | Comprehensive evaluation | ◯ | ◯ | ◯ | ◯ | X | X | X | X | X | X |

[*1]Fatty acid methyl ester chlorinated compound, CAS No. 26638-28-8

TABLE 2

|  |  | Examples | | | | | | |
| --- | --- | --- | --- | --- | --- | --- | --- | --- |
|  |  | 5 | 6 | 7 | 8 | 9 | 10 | 11 |
| Rosin-based resins | Acrylic acid modified hydrogenated rosin | 3.40 | 3.40 | 3.40 | 3.40 | 3.40 | 3.40 | 3.40 |
|  | Disproportionated rosin | 7.00 | 7.00 | 7.00 | 7.00 | 7.00 | 7.00 | 7.00 |
|  | Rosin ester | 1.60 | 1.60 | 1.60 | 1.60 | 1.60 | 1.60 | 1.60 |
| Solvent | Isopropyl alcohol | Balance | Balance | Balance | Balance | Balance | Balance | Balance |
| Organic acids | Succinic acid | 0.30 | 0.30 | 0.30 | 0.30 | 0.30 | 0.30 | 0.30 |
|  | Palmitic acid | 0.30 | 0.30 | 0.30 | 0.30 | 0.30 | 0.30 | 0.30 |
| Organochlorine compounds | Chlorendic acid | 2.00 |  |  | 1.00 | 0.30 |  |  |
|  | Methyl pentachlorooctadecanoate[*1] |  | 2.00 |  | 1.00 |  | 0.30 |  |
| Amine hydrochloride | Monoethylamine hydrochloride |  |  | 1.00 | 1.00 |  |  | 0.05 |
| Phosphonic acid ester | 2-Ethylhexyl (2-ethythexyl) phosphonate | 0.50 | 0.50 | 0.50 | 0.50 | 0.50 | 0.50 | 0.50 |
| Evaluation | Occurrence of bridge | ○ | ○ | ○ | ○ | ○ | ○ | ○ |
|  | Occurrence of ball | ○ | ○ | ○ | ○ | ○ | ○ | ○ |
|  | Comprehensive evaluation | ○ | ○ | ○ | ○ | ○ | ○ | ○ |

[*1]Fatty acid methyl ester chlorinated compound, CAS No. 26638-28-8

TABLE 3

|  |  | Comparative Examples | | | | |
| --- | --- | --- | --- | --- | --- | --- |
|  |  | 7 | 8 | 9 | 10 | 11 |
| Rosin-based resins | Acrylic acid modified hydrogenated rosin | 3.40 | 3.40 | 3.40 | 3.40 | 3.40 |
|  | Disproportionated rosin | 7.00 | 7.00 | 7.00 | 7.00 | 7.00 |
|  | Rosin ester | 1.60 | 1.60 | 1.60 | 1.60 | 1.60 |
| Solvent | Isopropyl alcohol | Balance | Balance | Balance | Balance | Balance |
| Organic acids | Succinic acid | 0.30 | 0.30 | 0.30 | 0.30 | 0.30 |
|  | Palmitic acid | 0.30 | 0.30 | 0.30 | 0.30 |  |
| Organochlorine compounds | Clorendic anhydride | 0.10 |  |  | 0.05 |  |
|  | Methyl pentachlorooctadecanoate[*1] |  | 0.10 |  | 0.05 |  |
| Amine hydrochloride | Monoethylamine hydrochloride |  |  | 0.04 | 0.04 |  |
| Phosphonic acid ester | 2-Ethylhexyl (2-ethylhexyl) phosphonate | 0.50 | 0.50 | 0.50 | 0.50 |  |
| Evaluation | Occurrence of bridge | X | X | X | X | X |
|  | Occurrence of ball | ○ | ○ | ○ | ○ | ○ |
|  | Comprehensive evaluation | X | X | X | X | X |

[*1]Fatty acid methyl ester chlorinated compound, CAS No. 26638-28-8

As in the results in the above described Tables 2 and 3, in the fluxes of Examples 5 to 11 which contained 0.3 to 2.0 mass % of an organochlorine compound and/or more than 0.04 mass % and 1.00 mass % or less of an amine hydrochloride and 0.2 to 1.5 mass % of a phosphonic acid ester, there was little occurrence of both of the bridge and the ball, and good results were obtained. In any of the fluxes of Examples 5, 6, 9 and 10 which contained 0.3 to 2.0 mass % of the organochlorine compound and the fluxes of Examples 7 and 11 which contained more than 0.04 mass % and 1.00 mass % or less of the amine hydrochloride, there was little occurrence of the bridge, but a tendency that there was less occurrence of the bridge in the fluxes of Examples 5, 6, 9 and 10 which contained the organochlorine compound than the fluxes of Examples 7 and 11 which contained the amine hydrochloride. It has been found from the comparison among the results of Examples 1 to 4 in Table 1 and Examples 5 to 11 in Table 2 that even though the contents of each of the organochlorine compound and the amine hydrochloride have been changed within each numeric value range, the occurrence of a bridge and a ball remains little, and good results are kept.

On the other hand, in the fluxes of Comparative Examples 7 and 8 in which the organochlorine compound was contained but the content thereof was less than 0.3 mass %, Comparative Example 9 in which the amine hydrochloride was contained but the content thereof was 0.04 mass % or less, and Comparative Example 10 in which the organochlorine compound and the amine hydrochloride were contained but each content thereof was less than 0.3 mass % and 0.04 mass % or less, there was little occurrence of the ball, but there was much occurrence of the bridge.

In addition, in the flux of Comparative Example 11 which did not contain all of the organochlorine compound, the amine hydrochloride, the phosphonic acid ester and the phenyl-substituted phosphinic acid, there was much occurrence of both of the bridge and the ball.

Examples 12 to 21

The fluxes of Examples 12 to 21 were prepared in the same manner as in Examples 1 to 4 and Comparative Examples 1 to 6, except that compositions shown in the following Table 4 were used in place of the compositions shown in the above described Table 1.

Then, each flux of Examples 12 to 21 was subjected to (1) the evaluation of the occurrence of a bridge and (2) the evaluation of the occurrence of a ball, as described above. The evaluation results are shown in the following Table 4.

TABLE 4

| | | Examples | | | | | | | | | |
|---|---|---|---|---|---|---|---|---|---|---|---|
| | | 12 | 13 | 14 | 15 | 16 | 17 | 18 | 19 | 20 | 21 |
| Rosin-based resins | Acrylic acid modified hydrogenated rosin | 3.40 | 3.40 | 3.40 | 3.40 | 3.40 | 3.40 | 3.40 | 3.40 | 3.40 | 3.40 |
| | Disproportionated rosin | 7.00 | 7.00 | 7.00 | 7.00 | 7.00 | 7.00 | 7.00 | 7.00 | 7.00 | 7.00 |
| | Rosin ester | 1.60 | 1.60 | 1.60 | 1.60 | 1.60 | 1.60 | 1.60 | 1.60 | 1.60 | 1.60 |
| Solvent | Isopropyl alcohol | Balance | Balance | Balance | Balance | Balance | Balance | Balance | Balance | Balance | Balance |
| Organic acids | Succinic acid | 0.30 | 0.30 | 0.30 | 0.30 | 0.30 | 0.30 | 0.30 | 0.30 | 0.30 | 0.30 |
| | Palmitic acid | 0.30 | 0.30 | 0.30 | 0.30 | 0.30 | 0.30 | 0.30 | 0.30 | 0.30 | 0.30 |
| Organochlorine Compound | Methyl pentachlorooctadecanoate[*1] | 0.90 | 0.90 | 0.90 | 0.90 | 0.90 | | | | | |
| Amine hydrochloride | Monoethylamine hydrochloride | | | | | | 0.05 | 0.05 | 0.05 | 0.05 | 0.05 |
| Phosphonic acid esters | n-Octyl (n-octyl) phosphonate | 0.50 | | | | | 0.50 | | | | |
| | n-Decyl (n-decyl) phosphonate | | 0.50 | | | | | 0.50 | | | |
| | n-Butyl (n-butyl) phosphonate | | | 0.50 | | | | | 0.50 | | |
| Phenyl-substituted phosphinic acids | Phenylphosphinic acid | | | | 0.50 | | | | | 0.50 | |
| | Diphenylphosphinic acid | | | | | 0.50 | | | | | 0.50 |
| Evaluation | Occurrence of bridge | ○ | ○ | ○ | ○ | ○ | ○ | ○ | ○ | ○ | ○ |
| | Occurrence of ball | ○ | ○ | ○ | ○ | ○ | ○ | ○ | ○ | ○ | ○ |
| | Comprehensive evaluation | ○ | ○ | ○ | ○ | ○ | ○ | ○ | ○ | ○ | ○ |

[*1]Fatty acid methyl ester chlorinated compound, CAS No. 26638-28-8

As in the results in the above described Table 4, in the fluxes of Examples 12 to 21 which contained 0.3 to 2.0 mass % of the organochlorine compound or more than 0.04 mass % and 1.00 mass % or less of the amine hydrochloride and 0.2 to 1.5 mass % of the phosphonic acid ester or the phenyl-substituted phosphinic acid, there was little occurrence of both of the bridge and the ball, and good results were obtained. In any of the fluxes of Examples 12 to 16 which contained 0.3 to 2.0 mass % of the organochlorine compound and the fluxes of Examples 17 to 21 which contained more than 0.04 mass % and 1.00 mass % or less of the amine hydrochloride, there was little occurrence of the bridge, but a tendency that there was less occurrence of the bridge in the fluxes of Examples 12 to 16 which contained the organochlorine compound than the fluxes of Examples 17 to 21 which contained the amine hydrochloride was seen. In addition, in any of the fluxes of Examples 12 to 14 and 17 to 19 which contained the phosphonic acid ester and the fluxes of Examples 15, 16, 20 and 21 which contained the phenyl-substituted phosphinic acid, there was little occurrence of the ball, but a tendency that there was less occurrence of the ball in the fluxes of Examples 12 to 14 and 17 to 19 which contained the phosphonic acid ester than the fluxes of Example 15, 16, 20 and 21 which contained the phenyl-substituted phosphinic acid was seen. It has been found from the comparison among the results of Example 1 in Table 1, Example 11 in Table 2 and Examples 12 to 21 in Table 4 that even though the type of the phosphonic acid ester or the phenyl-substituted phosphinic acid has been changed, the occurrence of a bridge and a ball remains little, and good results are kept.

Examples 22 to 25 and Comparative Examples 12 and 13

The fluxes of Examples 22 to 25 and Comparative Examples 12 and 13 were prepared in the same manner as in Examples 1 to 4 and Comparative Examples 1 to 6, except that compositions shown in the following Table 5 were used in place of the compositions shown in the above described Table 1.

Then, each flux of Examples 22 to 25 and Comparative Examples 12 and 13 were subjected to (1) the evaluation of the occurrence of a bridge and (2) the evaluation of the occurrence of a ball, as described above. The evaluation results are shown in the following Table 5.

TABLE 5

| | | Examples | | | | Comparative Examples | |
|---|---|---|---|---|---|---|---|
| | | 22 | 23 | 24 | 25 | 12 | 13 |
| Rosin-based resins | Acrylic acid modified hydrogenated rosin | 3.40 | 3.40 | 3.40 | 3.40 | 3.40 | 3.40 |
| | Disproportionated rosin | 7.00 | 7.00 | 7.00 | 7.00 | 7.00 | 7.00 |
| | Rosin ester | 1.60 | 1.60 | 1.60 | 1.60 | 1.60 | 1.60 |
| Solvent | Isopropyl alcohol | Balance | Balance | Balance | Balance | Balance | Balance |
| Organic acids | Succinic acid | 0.30 | 0.30 | 0.30 | 0.30 | 0.30 | 0.30 |
| | Palmitic acid | 0.30 | 0.30 | 030 | 0.30 | 0.30 | 0.30 |
| Organochlorine compound | Methyl pentachlorooctadecanoate[*1] | 0.90 | 0.90 | 0.90 | 0.90 | 0.90 | 0.90 |
| Phosphonic acid ester | 2-Ethylhexyl (2-ethythexy1) phosphonate | 1.50 | 0.20 | | | 0.10 | |

TABLE 5-continued

|  |  | Examples | | | | Comparative Examples | |
|---|---|---|---|---|---|---|---|
|  |  | 22 | 23 | 24 | 25 | 12 | 13 |
| Phenyl-substituted phosphinic acid | Phenylphosphinic acid |  |  | 1.50 | 0.20 |  | 0.10 |
| Evaluation | Occurrence of bridge | ○ | ○ | ○ | ○ | ○ | ○ |
|  | Occurrence of ball | ○ | ○ | ○ | ○ | X | X |
|  |  | ○ | ○ | ○ | ○ | X | X |
|  | Comprehensive evaluation | ○ | ○ | ○ | ○ | ○ | ○ |

[1]Fatty acid methyl ester chlorinated compound, CAS No. 26638-28-8

As in the results in the above described Table 5, in the fluxes of Examples 22 to 25 which contained 0.3 to 2.0 mass % of the organochlorine compound and 0.2 to 1.5 mass % of the phosphonic acid ester or the phenyl-substituted phosphinic acid, there was little occurrence of both of the bridge and the ball, and good results were obtained. In any of the fluxes of Examples 22 and 23 which contained the phosphonic acid ester and the fluxes of Examples 24 and 25 which contained the phenyl-substituted phosphinic acid, there was little occurrence of the ball, but a tendency that there was less occurrence of the ball in the fluxes of Examples 22 and 23 which contained the phosphonic acid ester than the fluxes of Example 24 and 25 which contained the phenyl-substituted phosphinic acid was seen. It has been found from the comparison among the results of Example 1 in Table 1, Example 15 in Table 4 and Examples 22 to 25 in Table 5 that even though the content of the phosphonic acid ester or the phenyl-substituted phosphinic acid was changed within a range of 0.2 to 1.5 mass %, the occurrence of a bridge and a ball remain little, and good results are kept.

On the other hand, in the fluxes of Comparative Examples 12 and 13 in which the phosphonic acid ester or the phenyl-substituted phosphinic acid was contained but the content thereof was less than 0.2 mass %, there was little occurrence of the bridge, but there was much occurrence of the ball.

Examples 26 to 47

The fluxes of Examples 26 to 47 were prepared in the same manner as in Examples 1 to 4 and Comparative Examples 1 to 6, except that compositions shown in the following Tables 6 to 8 were used in place of the compositions shown in the above described Table 1.

Then, each flux of Examples 26 to 47 was subjected to (1) the evaluation of the occurrence of a bridge and (2) the evaluation of the occurrence of a ball, as described above. The evaluation results are shown in the following Tables 6 to 8.

TABLE 6

|  |  | Examples | | | | | | | |
|---|---|---|---|---|---|---|---|---|---|
|  |  | 26 | 27 | 28 | 29 | 30 | 31 | 32 | 33 |
| Rosin-based resins | Acrylic acid modified hydrogenated rosin |  |  |  |  |  |  | 5.00 |  |
|  | Acrylic acid modified rosin | 3.40 | 5.00 | 3.40 | 5.00 | 3.40 | 5.00 |  | 2.00 |
|  | Disproportionated rosin | 7.00 |  | 7.00 |  | 7.00 |  | 10.00 |  |
|  | Hydrogenated rosin |  | 7.00 |  | 7.00 |  | 7.00 |  |  |
|  | Rosin ester | 1.60 |  | 1.60 |  | 1.60 |  | 3.00 |  |
| Solvent | Isopropyl alcohol | Balance | Balance | Balance | Balance | Balance | Balance | Balance | Balance |
| Organic acids | Succinic acid | 0.30 | 0.30 | 0.30 | 0.30 | 0.30 | 0.30 | 0.30 | 0.30 |
|  | Glutaric acid |  |  |  |  |  |  |  |  |
|  | Suberic acid |  |  |  |  |  |  |  |  |
|  | Palmitic acid | 0.30 | 0.30 | 0.30 | 0.30 | 0.30 | 0.30 | 0.30 | 0.30 |
| Organochlorine Compounds | Chlorendic acid | 0.90 |  |  |  |  |  |  |  |
|  | Chlorendic anhydride |  | 0.90 |  |  |  |  |  |  |
|  | Methyl pentachlorooctadecanoate[1] |  |  | 0.90 | 0.90 |  |  | 0.90 | 0.90 |
| Amine hydrochloride | Monoethylamine hydrochloride |  |  |  |  | 0.17 | 0.17 |  |  |
| Phosphonic acid ester | 2-Ethylhexyl (2-ethylhexyl) phosphonate | 0.50 | 0.50 | 0.50 | 0.50 | 0.50 | 0.50 | 0.50 | 0.50 |
| Evaluation | Occurrence of bridge | ○ | ○ | ○ | ○ | ○ | ○ | ○ | ○ |
|  | Occurrence of ball | ○ | ○ | ○ | ○ | ○ | ○ | ○ | ○ |
|  | Comprehensive evaluation | ○ | ○ | ○ | ○ | ○ | ○ | ○ | ○ |

[1]Fatty acid methyl ester chlorinated compound, CAS No. 26638-28-8

TABLE 7

| | | Examples | | | | | |
|---|---|---|---|---|---|---|---|
| | | 34 | 35 | 36 | 37 | 38 | 39 |
| Rosin-based resins | Acrylic acid modified hydrogenated rosin | 3.40 | 3.40 | 3.40 | 3.40 | 3.40 | 3.40 |
| | Disproportionated rosin | 7.00 | 7.00 | 7.00 | 7.00 | 7.00 | 7.00 |
| | Rosin ester | 1.60 | 1.60 | 1.60 | 1.60 | 1.60 | 1.60 |
| Solvent | Isopropyl alcohol | Balance | Balance | Balance | Balance | Balance | Balance |
| Organic acids | Succinic acid | | | 1.00 | 0.10 | 0.30 | 0.30 |
| | Glutaric acid | 0.60 | | 1.00 | | | |
| | Suberic acid | | 0.30 | 3.00 | | | |
| | Palmitic acid | | | | | | |
| Organochlorine compound | Methyl pentachlorooctadecanoate[*1] | 0.90 | 0.90 | 0.90 | 0.90 | 0.90 | 0.90 |
| Organobromine compound | trans-2,3-Dibromo-2-butene-1,4-diol | | | | | 3.00 | |
| Amine borate | Cyclohexylamine tetrafluoroborate | | | | | | 1.20 |
| Amine hydrobromides | Monoethylamine hydrochlomide | | | | | | 0.20 |
| | 1,3-Diphenylguanidine hydrobromide | | | | | | 0.60 |
| Phosphonic acid ester | 2-Ethylhexyl (2-ethylhexyl) phosphonate | 0.50 | 0.50 | 0.50 | 0.50 | 0.50 | 0.50 |
| Evaluation | Occurrence of bridge | ○ | ○ | ○ | ○ | ○ | ○ |
| | Occurrence of ball | ○ | ○ | ○ | ○ | ○ | ○ |
| | Comprehensive evaluation | ○ | ○ | ○ | ○ | ○ | ○ |

[*1]Fatty acid methyl ester chlorinated compound, CAS No. 26638-28-8

TABLE 8

| | | Examples | | | | | | | |
|---|---|---|---|---|---|---|---|---|---|
| | | 40 | 41 | 42 | 43 | 44 | 45 | 46 | 47 |
| Rosin-based resins | Acrylic acid modified hydrogenated rosin | 3.40 | 3.40 | 3.40 | 3.40 | | | | |
| | Acrylic acid-modified rosin | | | | | 5.00 | 5.00 | 5.00 | 5.00 |
| | Disproportionated rosin | 7.00 | 7.00 | 7.00 | 7.00 | | | | |
| | Hydrogenated rosin | | | | | 7.00 | 7.00 | 7.00 | 7.00 |
| | Rosin ester | 1.60 | 1.60 | 1.60 | 1.60 | | | | |
| Solvent | Isopropyl alcohol | Balance | Balance | Balance | Balance | Balance | Balance | Balance | Balance |
| Organic acids | Succinic acid | 0.30 | 0.30 | 0.30 | 0.30 | | | | |
| | Glutaric acid | | | | | 0.10 | 0.10 | 0.10 | 0.10 |
| | Suberic acid | | | | | 0.20 | 0.20 | 0.20 | 0.20 |
| | Palmitic acid | 0.30 | 0.30 | 0.30 | 0.30 | 0.30 | 0.30 | 0.30 | 0.30 |
| Organochlorine Compounds | Chlorendic acid | 0.90 | | | | 0.90 | | | |
| | Chlorendic anhydride | | 0.90 | | | | | | |
| | Methyl pentachlorooctadecanoate[*1] | | | 0.90 | | | | 0.90 | |
| Organobromine compounds | trans-2,3-Dibromo-2-butene-1,4-diol | 0.50 | 0.50 | 0.50 | 0.50 | 1.00 | 1.00 | 1.00 | 1.00 |
| Amine hydrochloride | Monoethylamine hydrochloride | | | | 0.17 | | | | 0.17 |
| Amine borate | Cyclohexylamine tetrafluoroborate | 0.30 | 0.30 | 0.30 | 0.30 | 0.60 | 0.60 | 0.60 | 0.60 |
| Amine hydrobromides | Monoethylamine hydrochlomide | | | | | | | | |
| | 1,3-Diphenylguanidine hydrobromide | 0.40 | 0.40 | 0.40 | 0.40 | 0.10 | 0.10 | 0.10 | 0.10 |
| Phosphonic acid ester | 2-Ethylhexyl (2-ethylhexyl) phosphonate | 0.50 | 0.50 | 0.50 | 0.50 | | | | |
| Phenyl-substituted phosphinic acid | Phenylphosphinic acid | | | | | 0.50 | 0.50 | 0.50 | 0.50 |
| Evaluation | Occurrence of bridge | ○ | ○ | ○ | ○ | ○ | ○ | ○ | ○ |
| | Occurrence of ball | ○ | ○ | ○ | ○ | ○ | ○ | ○ | ○ |
| | Comprehensive evaluation | ○ | ○ | ○ | ○ | ○ | ○ | ○ | ○ |

[*1]Fatty acid methyl ester chlorinated compound, CAS No. 26638-28-8

As in the results in the above described Tables 6 to 8, the fluxes of Examples 26 to 47 which contained 0.3 to 2.0 mass % of the organochlorine compound or more than 0.04 mass % and 1.00 mass % or less of the amine hydrochloride and 0.2 to 1.5 mass % of the phosphonic acid ester or the phenyl-substituted phosphinic acid were good in both evaluations of the occurrence of a bridge and a ball. In any of the fluxes of Examples 26 to 29, 32 to 42 and 44 to 46 which contained 0.3 to 2.0 mass % of the organochlorine compound and the fluxes of Examples 30, 31, 43 and 47 which contained more than 0.04 mass % and 1.00 mass % or less of the amine hydrochloride, there was little occurrence of the bridge, but a tendency that there was less occurrence of the bridge in the fluxes of Examples 26 to 29, 32 to 42 and 44 to 46 which contained the organochlorine compound than the fluxes of Examples 30, 31, 43 and 47 which contained the amine hydrochloride was seen. In addition, in any of the fluxes of Examples 26 to 43 which contained the phosphonic acid ester and the fluxes of Examples 44 to 47 which contained the phenyl-substituted phosphinic acid, there was little occurrence of the ball, but a tendency that there was less occurrence of the ball in the fluxes of Examples 26 to 43 which contained the phosphonic acid ester than the fluxes of Example 44 to 47 which contained the phenyl-substituted phosphinic acid was seen. It has been found from the results of Examples 26 to 47 that even though the formulation of the rosin-based resin, the organic acid, and an organohalogen compound other than the organochlorine compound, and/or an amine hydrohalide salt other than the amine hydrochloride was changed, the occurrence of a bridge and a ball remains little, and good results are kept.

The invention claimed is:

1. A flux comprising:
   at least one selected from 0.3 to 2.0 mass % of an organochlorine compound, and more than 0.04 mass % and 1.00 mass % or less of an amine hydrochloride; and
   0.2 to 1.5 mass % of an organophosphorus compound that is at least one selected from a phosphonic acid ester and a phenyl-substituted phosphinic acid, each based on the whole flux.

2. The flux according to claim 1, further comprising: a rosin-based resin, and an organic acid excluding the organochlorine compound.

3. The flux according to claim 1, wherein the organochlorine compound is at least one selected from chlorendic acid, chlorendic anhydride and methyl pentachlorooctadecanoate.

4. The flux according to claim 1, wherein the amine hydrochloride is ethylamine hydrochloride.

5. The flux according to claim 1, wherein the phosphonic acid ester is at least one selected from 2-ethylhexyl (2-ethylhexyl) phosphonate, n-octyl (n-octyl) phosphonate, n-decyl (n-decyl) phosphonate and n-butyl (n-butyl) phosphonate.

6. The flux according to claim 1, wherein the phenyl-substituted phosphinic acid is at least one selected from phenylphosphinic acid and diphenylphosphinic acid.

7. The flux according to claim 1, for use in a flow soldering method.

8. A resin composition for a flux, comprising:
   at least one selected from 2.0 to 14.0 mass % of an organochlorine compound and 0.27 to 7.00 mass % of an amine hydrochloride; and
   1.0 to 10.0 mass % of an organophosphorus compound that is at least one selected from a phosphonic acid ester and a phenyl-substituted phosphinic acid, each based on the whole composition for a flux.

9. The resin composition according to claim 8, further comprising: a rosin-based resin, and an organic acid excluding the organochlorine compound.

* * * * *